(12) United States Patent
Singh

(10) Patent No.: US 11,119,993 B2
(45) Date of Patent: Sep. 14, 2021

(54) REFERENTIAL DATA MIGRATION SYSTEM

(71) Applicant: salesforce.com, inc., San Francisco, CA (US)

(72) Inventor: Anoop Singh, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 485 days.

(21) Appl. No.: 15/884,172

(22) Filed: Jan. 30, 2018

(65) Prior Publication Data
US 2019/0236151 A1    Aug. 1, 2019

(51) Int. Cl.
*G06F 16/21*    (2019.01)
*G06F 16/23*    (2019.01)

(52) U.S. Cl.
CPC ........ *G06F 16/214* (2019.01); *G06F 16/2365* (2019.01)

(58) Field of Classification Search
CPC ............... G06F 16/214; G06F 16/2365; G06F 16/2379; G06F 16/275; G06F 11/2294; G06F 11/3672
See application file for complete search history.

(56) References Cited

U.S. PATENT DOCUMENTS

| | | | | |
|---|---|---|---|---|
| 7,921,330 B2 * | 4/2011 | Riemers | ................ | G06F 16/214 714/20 |
| 8,566,648 B2 * | 10/2013 | Schroeder | ........... | G06F 11/3672 714/38.14 |
| 2004/0003013 A1 | 1/2004 | Coulthard et al. | | |
| 2007/0186068 A1 | 8/2007 | Agrawal | | |
| 2007/0192360 A1 | 8/2007 | Prahlad et al. | | |
| 2007/0245010 A1* | 10/2007 | Arn | ..................... | H04L 67/1023 709/223 |
| 2010/0094808 A1 | 4/2010 | Erofeev | | |
| 2016/0335069 A1* | 11/2016 | Dehmann | ................. | G06F 8/71 |
| 2017/0046373 A1* | 2/2017 | Baker | .................... | G06F 16/23 |

(Continued)

OTHER PUBLICATIONS

Object Relationships Overview, salesforce.com, inc., https://help.salesforce.com/articleView?id=overview_of_custom_object_relationships.htm&type=5, 2 pages. [Retrieved Jan. 25, 2018].

(Continued)

*Primary Examiner* — Merilyn P Nguyen
(74) *Attorney, Agent, or Firm* — Kowert, Hood, Munyon, Rankin & Goetzel, P.C.

(57) ABSTRACT

In various embodiments, a method of transferring referential data objects may be performed. The method may include receiving, by a system, a request to move a specified plurality of data objects from a source environment to a target environment within a multi-tenant database system. The system may identify, based on data relationships of the data objects, an unspecified plurality of data objects associated with the specified plurality of data objects. The unspecified plurality of data objects may have a referential relationship to the specified plurality of data objects. The system may initiate a transfer of the specified and unspecified data objects. The system may also identify a data field of a data object that has a source environment-specific data value and modify the data field to a target environment-specific data value.

20 Claims, 6 Drawing Sheets

(56) References Cited

U.S. PATENT DOCUMENTS

2017/0235436 A1\* 8/2017 Hooton .................. G06F 3/0486
　　　　　　　　　　　　　　　　　　　　　705/7.11
2018/0246886 A1\* 8/2018 Dragomirescu ...... G06F 16/214

OTHER PUBLICATIONS

Considerations for Relationships, salesforce.com, inc., https://help.salesforce.com/articleView?id=relationships_considerations.htm&type=5, 4 pages. [Retrieved Jan. 25, 2018].

Lookup Relationship Fields on External Objects, salesforce.com, inc., https://help.salesforce.com/articleView?id=external_object_lookup_relationships.htm&type=5, 1 page. [Retrieved Jan. 25, 2018].

\* cited by examiner

Paired Record 402
Source Object: Approval_Process_c
Source Environment ID: aU49A000001
Target Environment ID:
Parent Record:

Paired Record 404
Source Object: Approval_Process_c
Source Environment ID: aU49A000001
Target Environment ID: aSaedA00ftg
Parent Record:

Paired Record 406
Source Object: Approval_Step_c
Source Environment ID: aSaedA00ftg
Target Environment ID:
Parent Record: aU49A0000-1 (Approval_Process_c)

Paired Record 408
Source Object: Approval_Step_c
Source Environment ID: aSaedA00ftg
Target Environment ID: ATraedA0ngt
Parent Record: aU49A000001 (Approval_Process_c)

*FIG. 4*

REFERENTIAL DATA MIGRATION SYSTEM

BACKGROUND

Migration of referential data to a target environment can be a difficult process. In particular, it may be difficult to identify all of the data objects associated with a data object selected for migration. As a result, in some cases, errors may occur as a result of attempting to use the selected data object. Additionally, in some cases, data values of transferred data objects should be altered to be consistent with the target environment. However, in some cases, because the data object may be associated with several other data objects, changing a data value may cause errors unless other data values are similarly changed. It may be difficult to identify all of the data objects associated with an altered data value.

BRIEF DESCRIPTION OF THE DRAWINGS

FIG. 4 is a block diagram illustrating an exemplary record pairing process, according to some embodiments.

Figure 1:
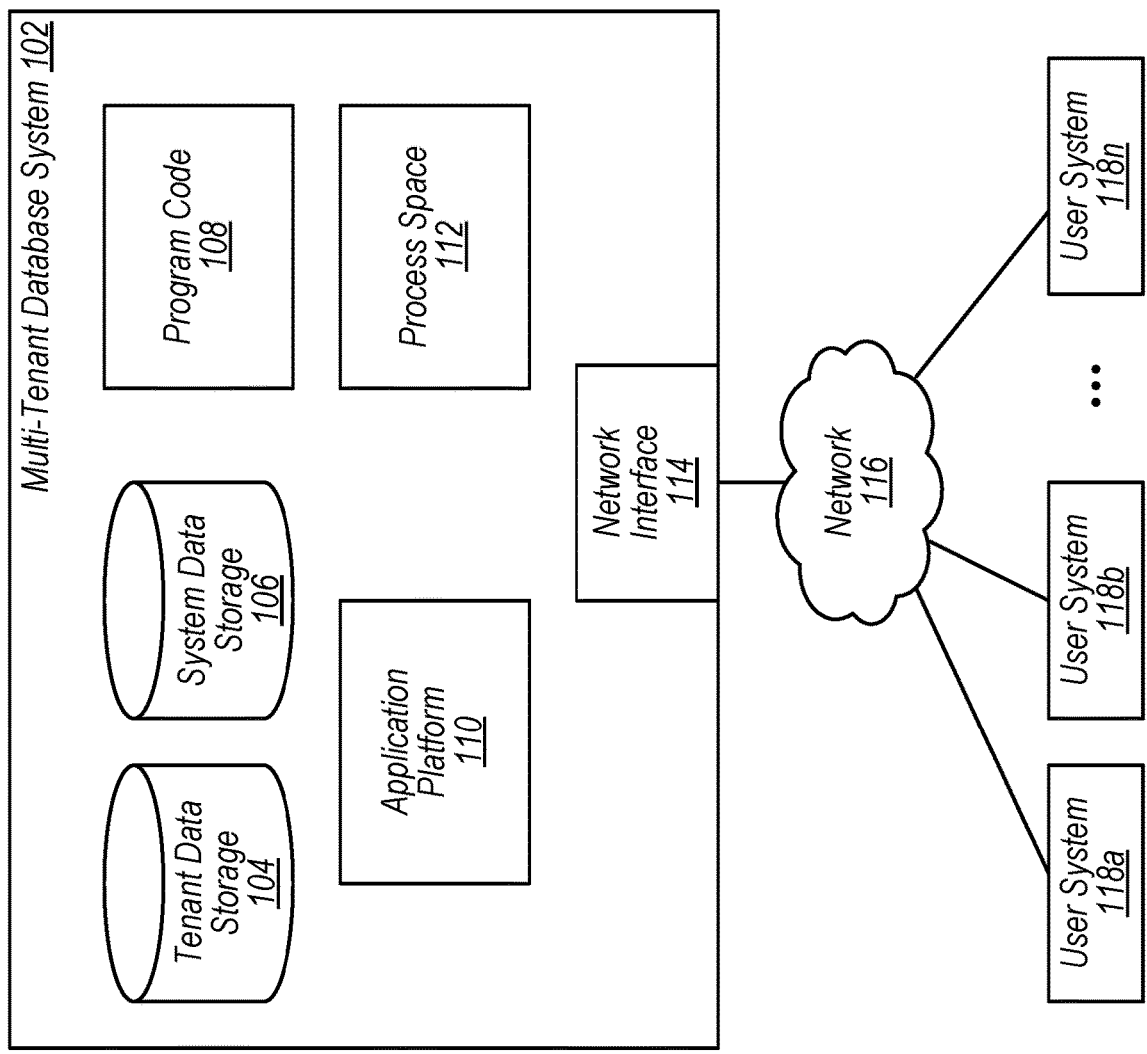
FIG. 1 is a block diagram illustrating an exemplary multi-tenant database system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processing element configured to verify access permissions" is intended to cover, for example, an element that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a computer system that includes six data objects, the terms "first data object" and "second data object" can be used to refer to any two of the six data objects, and not, for example, just logical data objects zero and one.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A referential data migration system is described herein where a request is received to transfer one or more data objects from a source environment (e.g., a master environment or a tenant environment of a multi-tenant database system) to a target environment (e.g., a tenant environment). The referential data migration system may identify data objects (e.g., unspecified data objects) associated with the one or more data objects specified by the request. For example, the unspecified data objects may be master objects, detail objects, lookup objects, data objects having a hierarchical relationship to one or more specified data objects, or any combination thereof. The referential data migration system may initiate a transfer of the one or more data objects and the unspecified data objects. Accordingly, in some cases, the system may automatically identify data objects associated with specified data objects. As a result, the system may, in some cases, reduce a number of errors resulting from missing data objects, as compared to a system where a user manually identifies all data objects to be transferred. Additionally, in some cases, the system may reduce a number of data objects to be manually identified by the user, as compared to a system where a user manually identifies all data objects to be transferred.

Subsequent to at least some of the data objects being transferred, the referential data migration system may identify a data field that has a source environment-specific data value. The data field may be used to permit reference to a corresponding data object within the target environment. Alternatively, the data field may be a reference to another data object within the target environment. To illustrate, the data value may include a local identification value or a local address. The system may receive an indication of a target environment-specific data value. The system may modify the data field to the target environment-specific data value. Additionally, in some cases, the system may further modify one or more other data values based on the target environment-specific data value. For example, the system may modify one or more hierarchical data values or the system may modify data values of one or more data objects that reference the source environment-specific data value. As a result, the system may, in some cases, reduce a number of errors resulting from a failure to modify source environment-specific data values, as compared to a system where a user manually modifies source environment-specific data values into target environment-specific data values. Additionally, in some cases, the system may reduce a number of data objects to be manually identified by the user, as compared to a system where a user manually identifies all data objects to be transferred.

Figure 2:
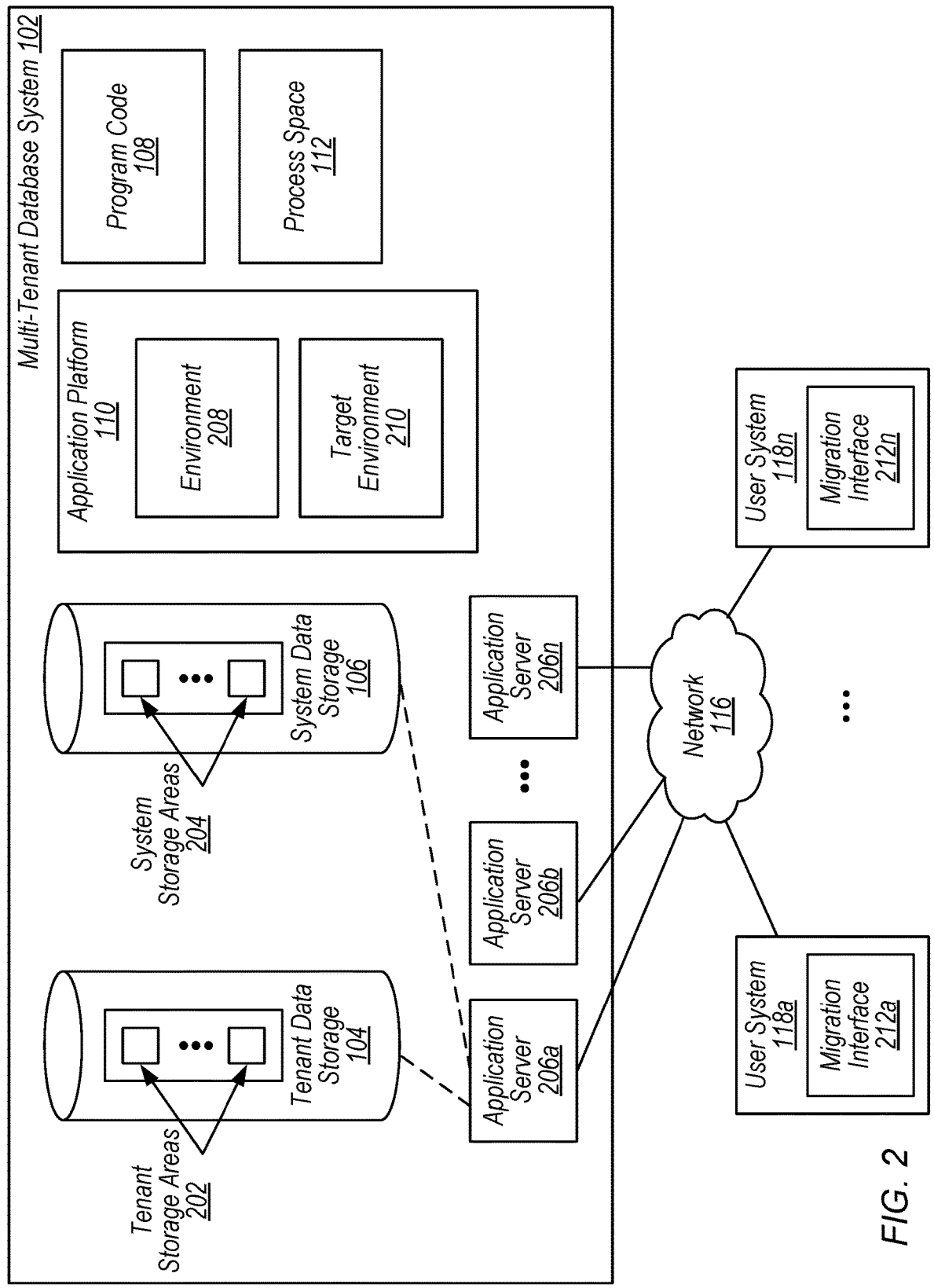
FIG. 2 is a block diagram illustrating an exemplary multi-tenant database system including a referential data migration system, according to some embodiments.

This disclosure initially describes, with reference to FIGS. 1 and 2, an exemplary multi-tenant database system that includes an exemplary referential data migration system. An exemplary environment including exemplary data objects is described with reference to FIG. 3. An exemplary record pairing process is described with reference to FIG. 4. A method of transferring a referential data object is described with reference to FIG. 5. Finally, an embodiment of a computing system that includes at least a portion of a referential data migration system is described with reference to FIG. 6.

Turning now to FIG. 1, an exemplary multi-tenant database system (MTS) 102 in which a referential data migration system may be implemented is shown. In FIG. 1, MTS 102 includes tenant data storage 104, system data storage 106, program code 108, application platform 110, process space 112, and network interface 114. In the illustrated embodiment, MTS 102 may be connected to various user systems 118a-n via network 116. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc.

One or more users (e.g., via user systems 118a-n), may interact with MTS 102 via network 116. MTS 102 may store information from one or more tenants stored into tables of a common database image. A database image may include one or more database objects. A relational database management system (RDMS), object oriented database management system (OODBMS) or the like may execute storage and retrieval of information against the database object(s). MTS 102 may include an application platform 110 that enables creation, managing and executing one or more applications developed by the provider of MTS 102, users accessing the MTS 102 via one or more user systems 118a-n, or third party application developers accessing MTS 102 via one or more user systems 118a-n. Accordingly, in some embodiments, user system 118a may correspond to a tenant of MTS 102, a provider (e.g., an administrator) of MTS 102, or a third party. In some embodiments, MTS 102 may be a network-based computing platform.

Because the users of user systems 118a-n may be users in differing capacities, the capacity of a particular user system 118a-n might be determined one or more permission levels associated with the current user. For example, when a salesperson is using a particular user system 118a to interact with MTS 102, that user system 118a may have capacities (e.g., user privileges) allotted to that salesperson. However, when an administrator is using the same user system 118a to interact with MTS 102, the user system 118a may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 116 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the disclosed embodiments may utilize any of various other types of networks.

User systems 118a-n may communicate with MTS 102 using TCP/IP and, at a higher network level, use other common Internet protocols to communicate, such as HTTP, FTP, AFS, WAP, etc. As an example, where HTTP is used, user system 118a might include an HTTP client commonly referred to as a "browser" for sending and receiving HTTP messages from an HTTP server at MTS 102. Such a server might be implemented as the sole network interface between MTS 102 and network 116, but other techniques might be used as well or instead. For example, as further discussed below with reference to FIG. 2, in some embodiments, a graphical user interface (GUI) associated with a referential data migration system may be used to provide instructions in a particular format (e.g., a javascript object notation (JSON) mapping). In some implementations, the interface between MTS 102 and network 116 includes load sharing functionality, such as round-robin HTTP request distributors to balance loads and distribute incoming HTTP requests evenly over a plurality of servers. In some cases, each of the plurality of servers has access to data stored on the MTS 102, at least for the users that are accessing a server.

In some embodiments, the system shown in FIG. 1 implements a web-based customer relationship management (CRM) system. For example, in some embodiments, MTS 102 includes application servers configured to implement and execute CRM software applications as well as provide related data, code, forms, web pages and other information to and from user systems 118 and to store to, and retrieve from, a database system related data, objects and web page content. In embodiments of a multi-tenant system, tenant data may be arranged such that data of one tenant is kept separate from that of other tenants so that that one tenant does not have access to another tenant's data, unless such data is expressly shared. Further, in some cases, tenants, providers, or other users of MTS 102 may create various environments such that other environments may not access data from other environments unless such data is expressly shared. In some embodiments, multiple environments may be associated with a single user. In various embodiments, MTS 102 implements applications other than, or in addition to, a CRM application. For example, MTS 102 may provide user systems 118 access to multiple hosted (standard and/or custom) applications, including a CRM application. User (or third party developer) applications, which may or may not include CRM, may be supported by the application platform 110. In particular, application platform 110 may manage creation of the applications, testing of the applications, storage of the applications into one or more database objects, execution of the applications in a virtual machine of process space 112, or any combination thereof.

One arrangement of elements of MTS 102 is shown in FIG. 1, including application platform 110, network interface 114, storage 104 for tenant data, storage 106 for system data accessible to MTS 102 and possibly multiple tenants, program code 108 for implementing various functions of MTS 102, and a process space 112 for executing MTS system processes and tenant-specific processes, such as running applications as part of an application service.

Several elements in the system shown in FIG. 1 may include conventional, well-known elements that need not be explained in detail here. For example, each user system 118 may be a desktop personal computer, workstation, laptop, PDA, cell phone, or any Wireless Access Protocol (WAP) enabled device or any other computing device capable of interfacing directly or indirectly to the Internet or other network connection. In some cases, user system 118a may include dedicated hardware configured to interface with MTS 102 over network 116. User system 118a may execute a graphical user interface (GUI) corresponding to MTS 102, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 118a to access, process, and view information and pages available to it from MTS 102 over network 116. Each user system 118 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 102 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 118 and its components are operator configurable using applications, such as a browser, that include computer code executable on one or more processing elements. Similarly, in some embodiments, MTS 102 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

According to some embodiments, each MTS 102 is configured to provide web pages, forms, applications, data, and/or media content to user systems 118a-n to support the access by user systems 118a-n as tenants of MTS 102. As such, in this embodiment, MTS 102 provides security mechanisms, such as encryption, to keep each tenant's data separate unless the data is shared. If more than one server is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Turning now to FIG. 2, exemplary embodiments of an MTS 102 and various interconnections are discussed in more detail. In this example, network interface 114 is implemented as one or more HTTP application servers 206a-n. Also illustrated are tenant data storage 104, system data storage 106, program code 108, and process space 112.

Tenant data storage 104 includes tenant storage areas 202 allocated to various tenants. System data storage 106 includes system storage areas 204. Application platform 110 includes environment 208 and target environment 210. User systems 118a and 118n include respective migration interfaces 212a and 212n. In the illustrated embodiment, tenant data storage 104 and system data storage 106 are connected to application server 206a. However, in other embodiments, other architectures may be imagined. For example, application server 206a may include tenant data storage 104. application platform 110, system database 106, and tenant database 108. In various embodiments, tenant database 108 may be sharded across application servers 100a-n and may be divided into individual tenant storage areas 112. Further, in some embodiments, some user systems may not include respective migration interfaces.

In the illustrated embodiment, application platform 110 includes various environments including environment 208 and target environment 210. These environments may be used for various purposes, such as supporting application developers' (e.g., administrators' or tenants') creation, execution, and management of applications. As discussed above, in the illustrated embodiment, environments may not access data from other environments unless such data is expressly shared. Data may be migrated into an environment (e.g., from another environment or from a system data set (also described herein as a master environment) such as one or more of system storage areas 204) using a data migration system.

In particular, in response to receiving a request (e.g., a request from user system 118a), MTS 102 may move a plurality of data objects into target environment 210. For example, user system 118a may request that a plurality of data objects be moved from environment 208, tenant data storage 104, system data storage 106, or any combination thereof, into target environment 210. MTS 102 may determine whether the data objects are referential data objects. For example, as further described below with reference to FIG. 3, MTS 102 may identify whether the data objects are hierarchical data objects or whether the data objects refer to lookup objects. In response to determining that a data object is a referential data object, MTS 102 may identify one or more data objects not identified by the request (unspecified data objects) and transfer the unspecified data objects into target environment 210.

MTS 102 may identify that a data field of a data object transferred to target environment 210 has a source environment-specific data value (e.g., a data value specific to environment 208, tenant data storage 104, or system data storage 106). For example, the data field may be an identification value of the data object or an address of the data object. MTS 102 may determine a target environment-specific data value for the data field. For example, MTS 102 may request, from user system 118a, an indication of the target environment-specific data value. The indication may include the target environment-specific data value or MTS 102 may derive the target environment-specific data value from the indication. MTS 102 may modify the data field to the target environment-specific data value. As a result, in some cases, reference to the data object may be permitted. Further, in some cases, MTS 102 may identify one or more other data objects that include data fields that should be modified based on the indication. For example, MTS 102 may identify one or more hierarchical data objects. MTS 102 may modify the data fields of the one or more other data objects based on the indication. In some embodiments, the process of modifying the data values may include creating one or more paired records, as further described with reference to FIG. 4.

In some embodiments, MTS 102 may include various additional data transfer features. For example, a user may specify one or more data objects that should not be transferred to the target environment (e.g., because those data objects will not be used by the user's application). The one or more data objects may be unspecified data objects discussed above. This indication may be received in response to MTS 102 identifying unspecified data objects or may be received prior to MTS 102 identifying unspecified data objects. In some cases, multiple indications may be received. As a result, fewer system resources may be used to complete the requested referential data migration. As another example, in some embodiments, MTS 102 may allow users to request a multi-threaded transfer of data to a target environment. In some cases, the user may specify a number of threads for the transfer. MTS 102 may separate the data objects identified for the transfer (i.e., the specified data objects and the unspecified data objects) into multiple transfers. In some cases, MTS 102 may identify data objects for different transfers automatically. In some cases, the user may indicate some or all data objects for the transfers. MTS 102 may use different resources to transfer the data objects simultaneously. As a result, in some cases, a transfer time associated with transferring data objects to a target environment may be reduced. Additionally, in some cases, MTS 102 may prevent data from being stored at intermediate locations between the source and the target environment. As a result, the data may be more secure, as compared to a system where data is stored at an intermediate location (e.g., a temporary memory location in an application server) as part of a transfer.

In some embodiments, each application server 206a-n is configured to handle requests for any user/organization. Because it is desirable to be able to add and remove application servers from the server pool at any time for any reason, there may be no server affinity for a user and/or organization to a specific application server 206. In some embodiments, therefore, an interface system (not shown) implementing a load balancing function (e.g., an F5 Big-IP load balancer) is located between the application servers 206 and the user systems 118 and is configured to distribute requests to the application servers 206. In some embodiments, the load balancer uses a least connections algorithm to route user requests to the application servers 206. Other examples of load balancing algorithms, such as are round robin and observed response time, also can be used. For example, in certain embodiments, three consecutive requests from the same user could hit three different servers, and three requests from different users could hit the same server. In this manner, MTS 102 is multi-tenant, wherein the MTS 102 handles storage of different objects and data across disparate users and organizations.

As an example of storage, one tenant might be a company that employs a sales force where each salesperson uses MTS 102 to manage their sales process. Thus, a user might maintain contact data, leads data customer follow-up data, performance data, goals and progress data, all applicable to that user's personal sales process (e.g., in a corresponding tenant storage area 202). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

Although each user's sales data may be separate from other users' sales data regardless of the employers of each user, some data may be organization-wide data shared or accessible by a plurality or all of the sales for a given organization that is a tenant. Thus, there may be some data structures managed by MTS 102 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 102 might also maintain system level data usable by multiple tenants (e.g., data stored in system storage areas 204 of system data storage 106). Such system level data might include industry reports, news, postings, and the like that are sharable among tenants.

It should also be understood that each application server 206 may be configured to communicate with various database systems, e.g., system data storage 106 and tenant data storage 104, via a different network connection. For example, one application server 206a might be coupled via network 116, another application server 206b might be coupled via a direct network link, and another application server 206n might be coupled by yet a different network connection. Transfer Control Protocol and Internet Protocol (TCP/IP) are exemplary protocols for communicating between application servers 206 and the database system, however, it will be apparent to one skilled in the art that other transport protocols may be used depending on the network interconnect used.

In certain embodiments, client user systems 118a-n communicate with application servers 206 to request and update system-level and tenant-level data from MTS 102 that may require one or more queries to system data storage 106 and/or tenant data storage 104. In some embodiments, MTS 102 automatically generates one or more SQL statements (the SQL query) designed to access the desired information. In some cases, user systems 118a-n may generate requests having a specific format corresponding to at least a portion of MTS 102. For example, user systems 118a-n may request to move data objects into a particular environment using an object notation that describes an object relationship mapping of the specified plurality of objects. In some embodiments, the object notation may be a javascript object notation (JSON) mapping. Users may be expected to generate instructions using the object notation or users may be provided (e.g., by MTS 102 or an organization associated with MTS 102) with an interface such as migration interface 212a that generates requests using the object notation. In the illustrated embodiment, migration interface 212a is a graphical user interface that generates the requests having the specific format.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Each database can generally be viewed as a collection of objects, such as a set of logical tables, containing data fitted into predefined categories. A "table" is one representation of a data object, and is used herein to simplify the conceptual description of objects and custom objects according to disclosed embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead and Opportunity data, each containing pre-defined fields.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain aspects, for example, all custom entity data rows are stored in a single multi-tenant physical table, which may contain multiple logical tables per organization. It may be transparent to customers that their multiple "tables" are in fact stored in one large table or that their data may be stored in the same table as the data of other customers.

Figure 3:
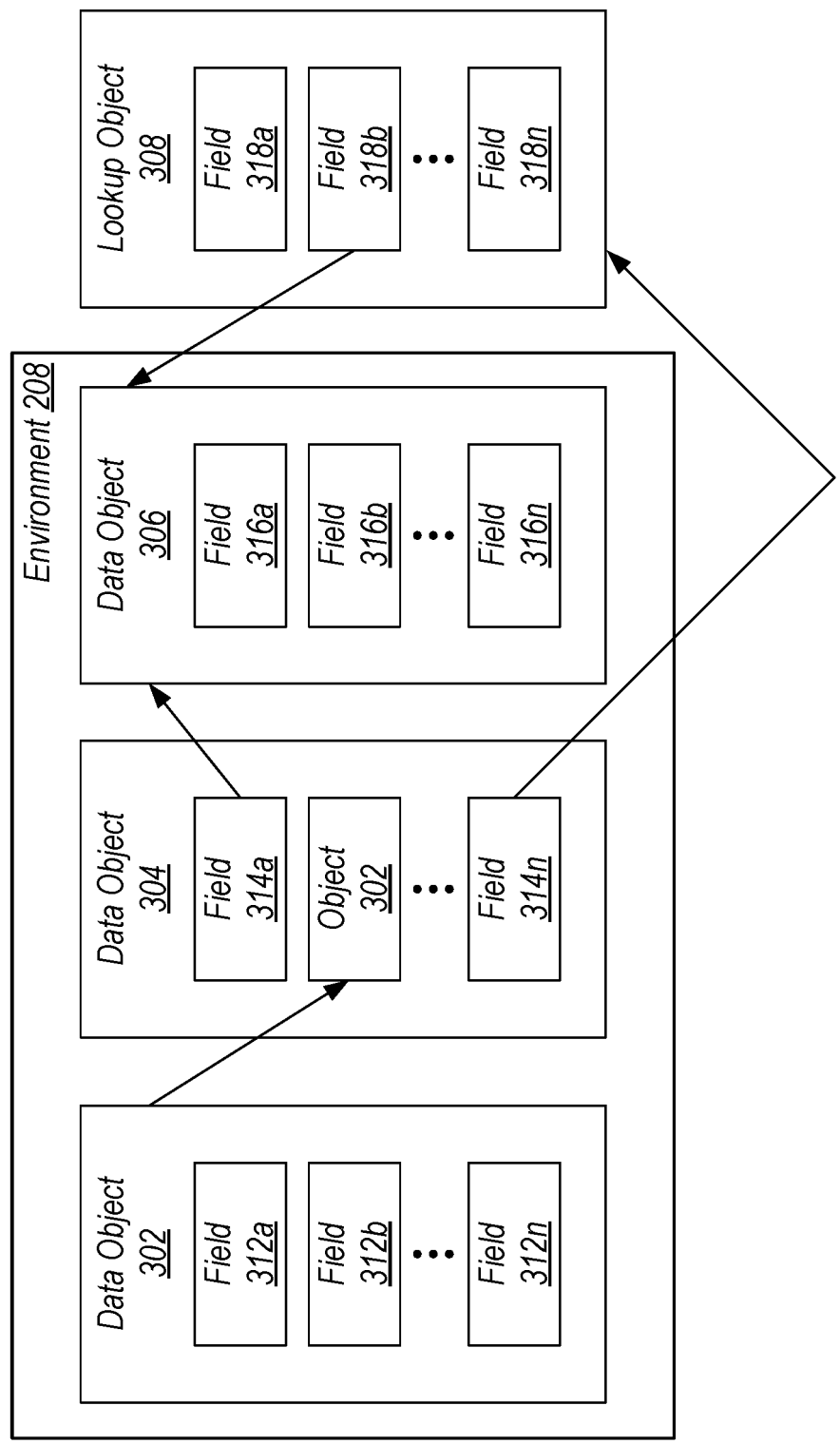
FIG. 3 is a block diagram illustrating exemplary object relationships in an exemplary environment, according to some embodiments.

Turning now to FIG. 3, a block diagram illustrating example object relationships in an environment 208 is shown. In the illustrated embodiment, environment 208 includes data objects 302, 304, and 306. Data object 302 includes fields 312a-n. Data object 304 includes fields 314a-n and a reference to object 302. Data object 306 includes fields 316a-n. Also illustrated, outside environment 208, is lookup object 308. Lookup object 308 includes fields 318a-n. However, in other cases, other relationships between data objects may be considered including master-detail relationships and many-to-many relationships.

As discussed above, data objects may have a referential relationship. For example, in the illustrated embodiment, data object 304 includes data object 302. Accordingly, data object 304 and data object 302 are in a hierarchical relationship where data object 304 is a parent of data object 302. Field 314a may refer to data object 306. For example field 314a may have a data structure indicated by data object 306. Data objects 302, 304, and 308 may include references to each other (e.g., addresses or identification numbers). For example, field 314a may include an identification number of data object 306. In the illustrated embodiment, these references may be specific to environment 208. As discussed above, when data objects are transferred into environment 208, values of these references may be modified from a source environment-specific data value into the data value specific to environment 208.

In the illustrated embodiment, field 314n refers to lookup object 308, where lookup object 308 is external to environment 208. Accordingly, data object 304 and lookup object 308 have an external lookup relationship where data field values are retrieved from an external source (an environment where lookup object 308 is stored). Further, in the illustrated embodiment, lookup object 308 refers to data object 306. Accordingly, data object 308 and data object 306 have an indirect lookup relationship where data values for an external source are linked to an internal data object.

As discussed above, the referential data migration system described herein may simplify transfer of referential data objects. Accordingly, as an example, the system may receive a request to replicate environment 208 in another environment (e.g., target environment 210 of FIG. 2). The system may receive an indication that data object 304 should be transferred. The system may automatically identify data objects 302 and 306 based on data relationships between data objects 302, 304, and 306. As a result, the system may transfer specified data object 304 and unspecified data objects 302 and 306 to the target environment.

Turning now to FIG. 4, a block diagram illustrating an exemplary record pairing process is shown. In the illustrated embodiment, paired records 402, 404, 406, and 408 are shown. The illustrated record pairing process may, in some cases, be used to identify object relationships between various data objects. In other embodiments, other forms of identifying relationships may be used (e.g., tables).

In the illustrated embodiment, a source environment may be queried to determine a source object name and identification value. Paired record 402 illustrates an exemplary resulting record. As discussed above, after a data object is created in a target environment, a source environment-specific data value may be modified to a target environment-specific data value. Paired record 404 illustrates a sample record that includes an exemplary target environment-specific identification value (e.g., to be stored in the target environment).

Paired record 406 illustrates an exemplary child record of paired record 402 (e.g., in the source environment). Paired record 406 includes an indication of the record of paired record 402 as a parent record as well as a source object name and identification value for the child record. Paired record 408 illustrates a sample record that includes an indication of the record of paired record 404. In the illustrated embodiment, the identification value of paired record 408 is identified by the target identification value of paired record 404. Additionally, for illustrative purposes, paired record 408 includes an indication of another target environment identification value (e.g., a child of the object of paired record 408).

Figure 5:
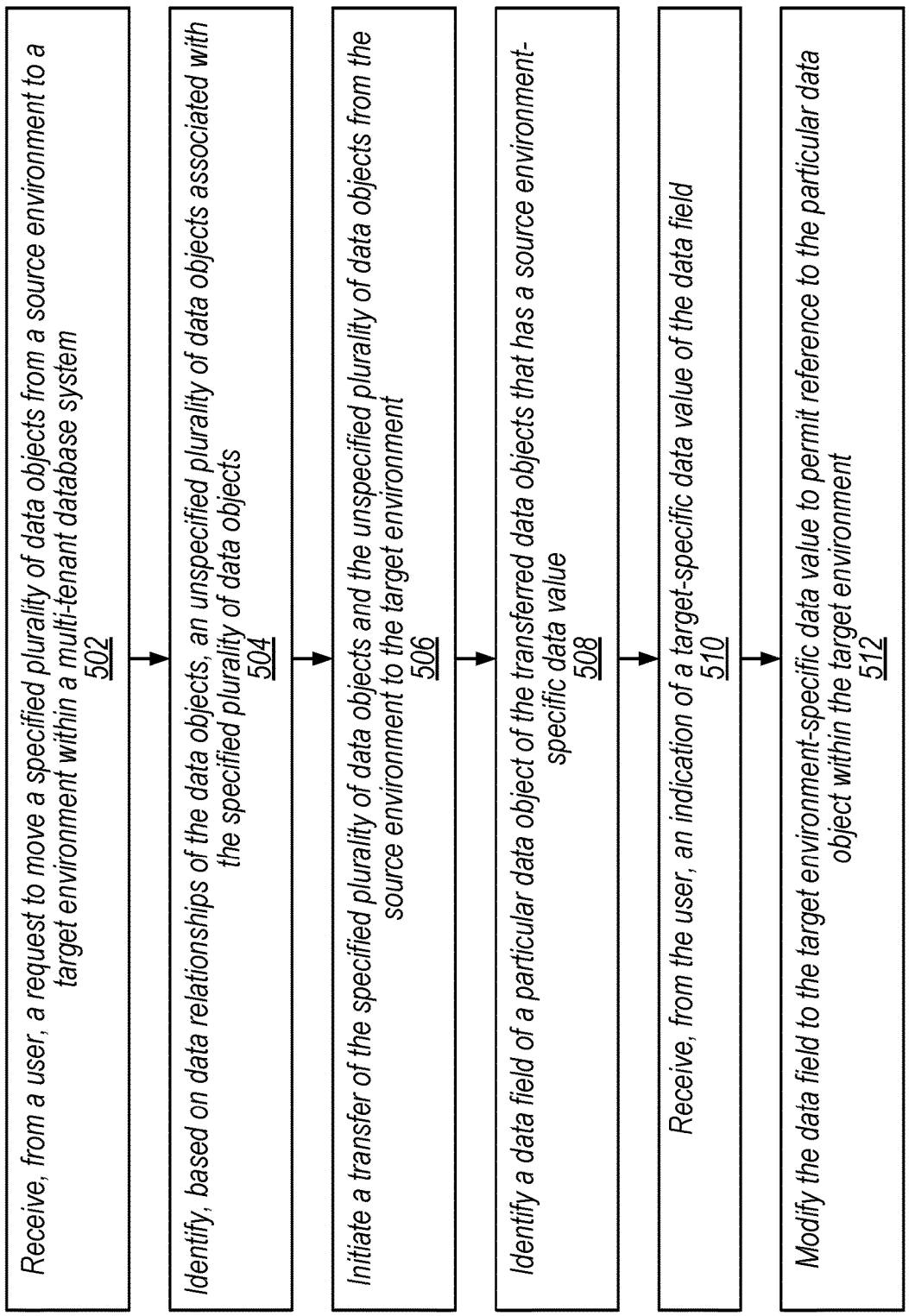
FIG. 5 is a flow diagram illustrating an exemplary embodiment of a method of transferring a referential data object.

Referring now to FIG. 5, a flow diagram of a method of transferring a referential data object is shown. In some embodiments, the method may be initiated or performed by one or more processors in response to one or more instructions stored by a computer-readable storage medium. In various embodiments, as discussed above, various portions of the method may be omitted (e.g., block 510 may be omitted), combined, or may be performed in a different order (e.g., blocks 508 and 510 may be switched).

At 502, the method includes receiving, from a user, a request to move a specified plurality of data objects from a source environment to a target environment within a multi-tenant database system. For example, MTS 102 of FIG. 2 may receive a request from a user of user system 118a to move data objects 302 and 304 of FIG. 3 from environment 208 to target environment 210.

At 504, the method includes identifying, based on data relationships of the data objects, an unspecified plurality of data objects associated with the specified plurality of data objects. For example, MTS 102 may identify a plurality of unspecified data objects including lookup object 306.

At 506, the method includes initiating a transfer of the specified plurality of data objects and the unspecified plurality of data objects from the source environment to the target environment. For example, MTS 102 may transfer the data objects from environment 208 to target environment 210.

At 508, the method includes identifying a data field of a particular data object of the transferred data objects that has a source environment-specific data value. For example, MTS 102 may identify an object identification value for field 312a that is specific to environment 208.

At 510, the method includes receiving, from the user, an indication of a target-specific data value of the data field. For example, MTS 102 may receive an indication of the object identification value for field 312a that is specific to target environment 210.

At 512, the method includes modifying the data field to the target environment-specific data value to permit reference to the particular data object within the target environment. For example, MTS 102 may derive a target environment-specific data value from the indication and modify the object identification value to the target environment-specific data value. Accordingly, a method of transferring a referential data object is depicted.

Figure 6:
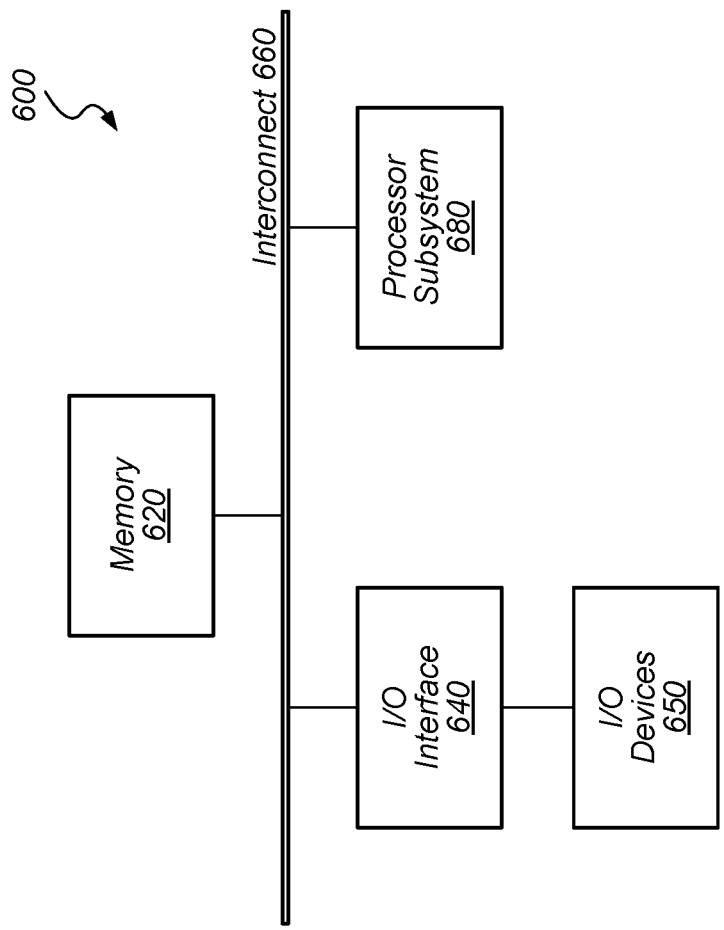
FIG. 6 is a block diagram illustrating an embodiment of a computing system that includes at least a portion of a referential data migration system.

Turning now to FIG. 6, a block diagram of an exemplary computer system 600, which may correspond to a portion of or all of a computer system of MTS 102 (e.g., application server 206a or another computer system), a portion or all of a user system (e.g., user system 118a), or any combination thereof, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, computer system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause computer system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as system memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In various embodiments, data stored by or data, that when executed by a processor, causes the processor to perform operations described above with reference to FIGS. 1-5, or any combination thereof described above may be included within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable storage medium having computer instructions stored thereon that, when executed by a computer system, cause operations comprising:
   receiving a request to move a first data object from a source environment to a target environment within a multi-tenant database system, wherein the source environment is used to execute a software application that utilizes the first data object, and wherein the target environment is a testing environment used to test the software application;
   identifying a second data object that is referenced by the first data object, wherein the second data object is not specified by the request; and
   migrating a plurality of data objects, including the first and second data objects, from the source environment to the target environment, including by:
      transferring the plurality of data objects to the target environment;
      identifying, for a particular data object of the plurality of data objects, a data field that has a source environment-specific data value;
      determining, for the particular data object, a target environment-specific data value for the data field; and
      modifying the data field, for the particular data object, from the source environment-specific data value to the target environment-specific data value.

2. The non-transitory computer-readable storage medium of claim 1, wherein the operations further comprise receiving an indication of the target environment-specific data value, wherein the data field is modified based on the indication of the target environment-specific data value.

3. The non-transitory computer-readable storage medium of claim 2, wherein the operations further comprise generating a paired record that includes the target environment-specific data value and the source environment-specific data value.

4. The non-transitory computer-readable storage medium of claim 2, wherein the determining includes deriving the target environment-specific data value based on the indication.

5. The non-transitory computer-readable storage medium of claim 1, wherein the operations further comprise receiving an indication of a subset of the plurality of data objects that are not to be transferred to the target environment.

6. The non-transitory computer-readable storage medium of claim 1, wherein the operations further comprise:
   determining that the request to move the first data object requests a multi-threaded transfer; and
   separating the plurality of data objects into a particular number of transfers from the source environment to the target environment.

7. The non-transitory, computer-readable medium of claim 1, wherein the data field corresponds to an identifier for the particular data object.

8. The non-transitory, computer-readable medium of claim 1, wherein the operations further comprise:
   identifying a third data object that is referenced by the first data object, wherein the third data object is not specified by the request;
   providing a notification, to a requesting user, specifying that the second and third data objects are referenced by the first data object; and receiving, from the requesting user, an indication that the third data object is not to be migrated to the target environment.

9. A method, comprising:

receiving, by a computer system from a user, a request to move a first data object from a source environment to a target environment within a multi-tenant database system, wherein the source environment is used to execute a software application that utilizes the first data object, and wherein the target environment is a testing environment used to test the software application;

identifying, by the computer system, a second data object that is referenced by the first data object, wherein the second data object is not specified by the request; and migrating, by the computer system, a plurality of data objects, including the first and second data objects, from the source environment to the target environment, including by:

transferring the plurality of data objects to the target environment;

identifying, for a particular data object of the plurality of data objects, a data field that has a source environment-specific data value;

receiving, from the user, an indication of a target environment-specific data value of the data field for the particular data object; and modifying the data field, for the particular data object, from the source environment-specific data value to the target environment-specific data value.

10. The method of claim 9, wherein the user is a tenant of the multi-tenant database system.

11. The method of claim 9, wherein the source environment is a tenant environment of the multi-tenant database system.

12. The method of claim 9, wherein the source environment is a master environment of the multi-tenant database system.

13. The method of claim 9, wherein the second data object is a lookup object.

14. The method of claim 13, wherein the identifying includes identifying a third data object that is referenced by the lookup object.

15. The method of claim 9, wherein the second data object is stored in a third environment that is separate from the source environment and the target environment.

16. The method of claim 9, wherein the request to move the first data object is a request to replicate the source environment in the target environment.

17. A non-transitory computer-readable storage medium having computer instructions stored thereon that, when executed by a computer system, cause operations comprising:

receiving, from a tenant of a multi-tenant database system, a request to move a first data object from a source environment to a target environment within the multi-tenant database system, wherein the source environment is used to execute a software application that utilizes the first data object, and wherein the target environment is a testing environment used to test the software application;

identifying a second data object that is referenced by the first data object, wherein the second data object is not specified by the request; and migrating a plurality of data objects, including the first and second data objects, from the source environment to the target environment, including by:

transferring the plurality of data objects to the target environment;

identifying, for a particular data object of the plurality of data objects, a data field that has a source environment-specific data value;

requesting, from the tenant, an indication of a target environment-specific data value for the data field; and modifying the data field, for the particular data object, from the source environment-specific data value to the target environment-specific data value.

18. The non-transitory computer-readable storage medium of claim 17, wherein modifying the data field comprises modifying the data field to permit reference to the particular data object by another data object of the plurality of data objects.

19. The non-transitory computer-readable storage medium of claim 17, wherein the operations further comprise modifying, for a second particular data object, a second data field from the source environment-specific data value to the target environment-specific data value to permit reference by the second particular data object to the particular data object within the target environment.

20. The non-transitory computer-readable storage medium of claim 19, wherein the second particular data object is one of the plurality of data objects.

* * * * *